United States Patent Office 3,359,264
Patented Dec. 19, 1967

3,359,264
BENZO[a]QUINOLIZINE DERIVATIVES AND PROCESSES FOR THE MANUFACTURE THEREOF
Max Gerecke, Basel, Switzerland, assignor to Hoffmann-La Roche Inc., Nutley, N.J., a corporation of New Jersey
No Drawing. Filed June 5, 1964, Ser. No. 373,043
Claims priority, application Switzerland, June 7, 1963, 7,040/63
13 Claims. (Cl. 260—240)

The present invention relates to intermediates and processes suitable for the preparation of a pharmaceutically useful class of benzo[a]quinolizines. More particularly, in one aspect, the present invention relates to a process for the preparation of benzo[a]quinolizine compounds of the formula

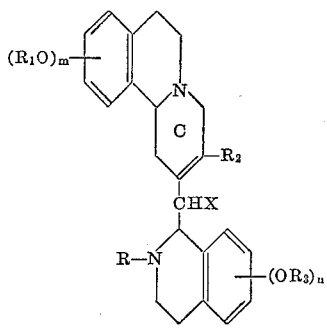

I wherein R is selected from the group consisting of hydrogen, ar-lower alkyl, lower alkyl, and lower alkenyl; X is selected from the group consisting of hydrogen, carboxy, carb-lower alkoxy and cyano; $m$ and $n$ are each whole integers from 1 to 4; $R_1$, $R_2$ and $R_3$ are each, individually, lower alkyl and when $m$ or $n$ is greater than 1, two adjacent $R_1O$ and/or $R_3O$ groups can together form a lower alkylenedioxy group.

As used herein, the term "lower alkyl" comprehends both straight and branched chain saturated hydrocarbon groups, for example, methyl, ethyl, propyl and the like. Similarly, the term "lower alkenyl" comprehends both straight and branched hydrocarbon groups containing olefinic linkages, for example, groups such as allyl and the like. Especially preferred are lower alkyl and lower alkenyl groups containing from 1 to 4 carbon atoms. The term "ar-lower alkyl" comprehends groups containing, for example, a phenyl ring bonded to a lower alkyl chain (the phenyl ring can be either unsubstituted or substituted with moieties such as lower alkyl, e.g., methyl, nitro, lower alkoxy, e.g., methoxy, hydroxy or the like, for example, benzyl, p-nitrobenzyl, and the like). Benzyl is the preferred ar-lower alkyl group. "Carb-lower alkoxy" comprehends groups derived from lower alkanoic acids; the carbomethoxy group being especially preferred. "Lower alkylenedioxy" refers to groups such as methylenedioxy and the like. Especially preferred are compounds in which $R_1$, $R_2$ and $R_3$ are independently selected from the group consisting of methyl and ethyl.

The compounds of Formula I are a known class of pharmaceutically useful compounds, useful either in the preparation of chemotherapeutic compounds or useful per se as chemotherapeutic compounds, for example, 2-dehydro-emetine is an outstanding chemotherapeutic useful for the control and treatment of amoebic dysentery and bilharziasis.

According to the processes of the instant invention, compounds of Formula I are prepared from 6,7-dihydro-benzo[a]quinolizinium salts having a cation of the formula

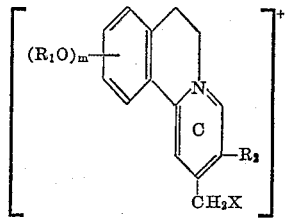

II wherein $R_1$, $R_2$, X and $m$ have the same meaning as above.

Compounds having a cation of Formula II can be obtained from the corresponding tetrahydro-benzo[a]quinolizine compounds (described, for example, in Helv. Chim. Acta, 45: 2219–2226) by oxidation with mercuric acetate.

One embodiment of the present invention consists of reacting a compound having a cation of Formula II with a 3,4-dihydroisoquinolinium salt having a cation of the formula

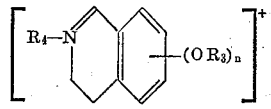

III wherein $R_3$ and $n$ have the same meaning as above, and $R_4$ is selected from the group consisting of ar-lower alkyl, lower alkyl and lower alkenyl.

The condensation product (see Formula IV, infra) obtained by the reaction of a compound having a cation of Formula II with a compound having a cation of Formula III can then be hydrogenated in ring C to yield a compound of Formula I. When a compound having a cation of Formula II wherein X is carb-lower alkoxy or cyano is utilized as a starting material, the condensation product can be subjected to saponification and decarboxylation prior to the hydrogenation of ring C. When a compound having a cation of Formula II wherein X is carboxy is utilized as the starting material, then the condensation product can be subjected to decarboxylation prior to the hydrogenation of ring C. Also, the substituent represented by $R_4$ can be cleaved or reduced before or after the hydrogenation of ring C of the condensation product to yield a compound of Formula I.

Compounds having a cation of Formula III in which $R_4$ is lower alkyl or ar-lower alkyl are known compounds. Compounds having a cation of Formula III in which $R_4$ is lower alkenyl are novel compounds and are a part of this invention. These 2-lower alkenyl-isoquinolinium compounds can be obtained by N-lower alkenylation of the corresponding N - unsubstituted - isoquinolinium compounds.

The reaction of the 6,7-dihydro-benzo[a]quinolizinium salts having a cation of Formula II with a 3,4-dihydroisoquinolinium salt having a cation of Formula III yields a 2-[(1′,2′,3′,4′-tetrahydro-1′-isoquinolinyl)-methyl]-6,7-dihydro-benzol[a]quinolizinium compound having a cation of the formula

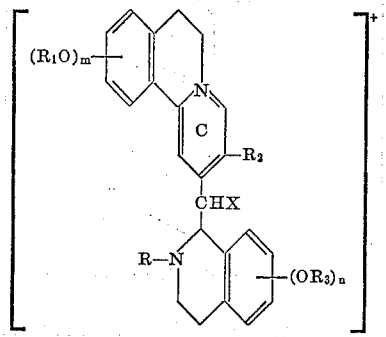

IV wherein X, $R_1$, $R_2$, $R_3$, R, $n$ and $m$ have the same meaning as above.

When carrying out the reaction of a compound having a cation of Formula II with a compound having a cation of Formula III, there is preferably used as the compound having a cation of Formula II, a 2-methyl-3-ethyl-6,7-dihydro-9,10-dimethoxy-benzo[a]quinolizinium salt (for example, the quinolizinium bromide) and as the starting compound having a cation of Formula III, a 2-benzyl-3,4-dihydro-6,7-dimethoxy-isoquinolinium salt (for example, the isoquinolinium bromide). By reaction of the aforesaid two starting materials, there is obtained as the product, 2-[(2'-benzyl-6',7'-dimethoxy-1',2',3',4'-tetrahydro-1'-isoquinolinyl)-methyl] - 3 - ethyl-9,10-dimethoxy-6,7-dihydro-benzo[a]quinolizinium bromide. 2-dehydro-emetine can be obtained from this latter compound either by debenzylation followed by hydrogenation, or by hydrogenation followed by debenzylation.

The reaction of a compound having a cation of Formula II with a compound having a cation of Formula III is preferably carried out in a basic medium. It is particularly advantageous to carry out the reaction in an aqueous basic medium. It is especially suitable to carry out the reaction in an aqueous solution of a tri-lower alkylamine, for example, in an aqueous solution of trimethylamine. The reaction can be effected within a wide temperature range, for example, from about $-10°$ C. to about 70° C. Preferably, however, the reaction is carried out at a temperature of between about 20° C. and about 50° C.

The hydrogenation of the reaction product is conveniently effected by means of a metal hydride which is usable in an aqueous or lower alkanolic solution. Particularly useful as such metal hydrides are alkali borohydrides such as, for example, sodium borohydride.

The cleavage of the substituent $R_4$ or its reduction (as has already been mentioned above, these steps can be carried out either before or after hydrogenation of ring C) is conveniently effected by catalytic hydrogenation. The catalyst can be, for example, palladium/carbon or platinum.

Another embodiment of the instant invention comprises preparing compounds of Formula I wherein R and X are both hydrogen, utilizing starting materials having a cation of Formula II wherein $R_1$, $R_2$ and $m$ have the same meaning as above and X is hydrogen. In this process, such a starting compound having a cation of Formula II wherein X is hydrogen is reacted with a compound of the formula

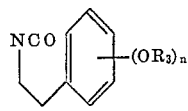

V wherein $R_3$ and $n$ have the same meaning as above.

This reaction yields a compound having a cation of the formula

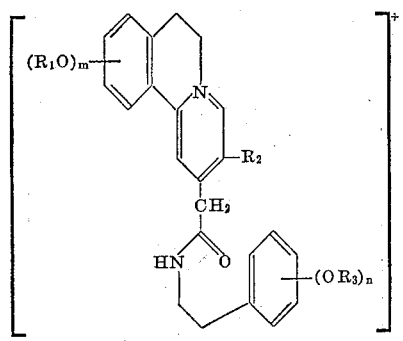

VIa wherein $R_1$, $R_2$, $R_3$, $m$ and $n$ have the same meaning as above.

The quaternary compound having a cation of Formula VIa is tautomeric with the corresponding free base of the formula

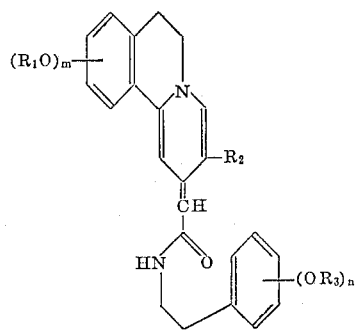

VIb wherein $R_1$, $R_2$, $R_3$, $m$ and $n$ have the same meaning as above.

The compound having a cation of Formula VIa can, in turn, be converted to a compound having a cation of the formula

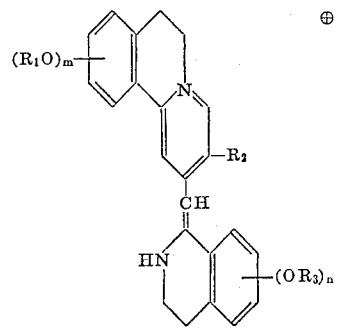

VIIa wherein $R_1$, $R_2$, $R_3$, $m$ and $n$ have the same meaning as above, and said compound having a cation of Formula VIIa is tautomeric with the corresponding free base of the formula

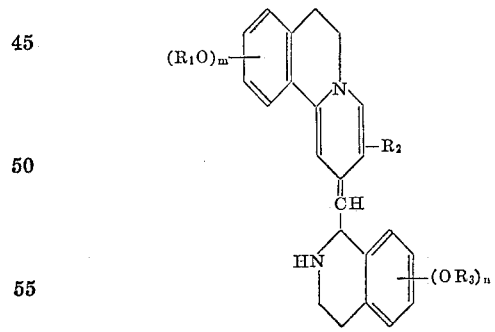

VIIb wherein $R_1$, $R_2$, $R_3$, $m$ and $n$ have the same meaning as above.

The reaction of a compound having a cation of Formula II with a compound of Formula V is suitably effected in a basic medium. The reaction product of Formula VIa obtained thereby can occur in two tautomeric forms; VIa and VIb, according to the pH value of the medium in which it is situated (i.e., in an alkaline medium it exists as VIa and in an acidic medium it exists as VIb). By reaction of a compound of Formula VIa with phosphorus oxychloride, ring closure is effected and a compound having a cation of Formula VIIa is obtained. A compound having a cation of Formula VIIa can, in turn, be converted into the corresponding tautomeric tertiary base of Formula VIIb via treatment with an alkaline medium, for example, an alkali hydroxide such as sodium hydroxide.

A compound having a cation of Formula VIIa or the corresponding tertiary base of Formula VIIb can be hydrogenated in ring C to yield the desired end product of Formula I wherein X and R₄ are both hydrogen. This hydrogenation of ring C can be effected in one step by using an alkali metal borohydride (preferably, sodium borohydride) as the reducing agent. In another embodiment the hydrogenation of a compound having a cation of Formula VIIa or of the corresponding tertiary base of Formula VIIb can be carried out in two steps. In the first step, the reaction product of Formula VIIa is catalytically hydrogenated and then, in the second step, is hydrogenated with an alkali metal borohydride. In this two-step process, platinum is preferably used as the hydrogenation catalyst and sodium borohydride is preferably used as the alkali metal borohydride. By the catalytic hydrogenation step of this two-step process, one obtains a hydrogenation product identical to the starting material methylidene compound having a cation of Formula VIIa, wherein the methylidene linkage has been reduced to the corresponding methylene linkage but in which ring C has not yet been hydrogenated. The alkali metal borohydride reduction step then results in hydrogenation of ring C to yield a compound of Formula I. Of the two tautomeric forms, it is preferable to use a compound having a cation of Formula VIIa as the starting material for both the one-step hydrogenation and the two-step hydrogenation.

The starting material compounds of Formula V can be manufactured from corresponding known phenylethylamines according to known methods, for example, see Ann. Chem., 562: 75–136 (1949).

The anion of the compounds having a cation of any of Formulae II, III, IV, VIa and VIIa is not critical. The anion should, of course, be one which does not interfere with the reaction sequence and which does not degrade the cation. The anion can be derived from either organic or inorganic acids, for example, hydrogen halides, sulfuric acid, perchloric acid, acetic acid, oxalic acid or the like. Especially preferred are the chloride, bromide or perchlorate ions. Compounds having these preferred anions can either be formed directly by the reactions of this invention, or can be formed from compounds containing different cations by simple exchange reactions.

The compounds of Formula I and those having a cation of any of Formulae II, III, IV, VIa and VIIa contain a basic nitrogen atom in their isoquinoline part and form acid addition salts with both inorganic and organic acids. Insofar as compounds of formula I and those having a cation of any of Formulae III, IV and VIIa are novel and within the scope of the instant invention, also their acid addition salts are within the scope of this invention. Thus, the compounds form acid addition salts with acids such as hydrohalic acids, perchloric acid, sulfuric acid, acetic acid, picric acid, oxalic acid and the like. Of those novel compounds useful as chemotherapeutics, pharmaceutically acceptable acid addition salts are preferred. Preferred acid addition salts can be formed either directly or by simple exchange reactions with other acid addition salts.

The following examples are illustrative but not limitative of the invention. All temperatures are stated in ° C.

*Example 1*

4 g. of 2-methyl-3-ethyl-9,10-dimethoxy-1,4,6,7-tetrahydro-11bH-benzo[a]quinolizine hydrochloride is dissolved in water and treated with an aqueous sodium hydroxide solution. The base which forms is thereafter taken up in chloroform and the solvent evaporated. The residue which remains behind is dissolved in 200 ml. of 10 percent acetic acid, and, after the addition of 18 g. of mercury-II acetate, the solution heated to 40° for 16 hours. The mercury-I acetate which separates out during this period is filtered off and the filtrate treated with hydrogen sulphide. The mercury sulphide which separates out is then filtered off and the filtrate concentrated to 20–30 ml. in vacuum. To this concentrated solution there is added 2 ml. of 63 percent hydrobromic acid, whereupon 2 - methyl - 3 - ethyl - 6,7 - dihydro - 9,10-dimethoxy-benzo[a]quinolizinium bromide crystallizes out. After filtration and recrystallization from ethanol/ether, there is obtained 3.3 g. of said product melting at 245°.

The corresponding perchlorate has a melting point of 243–244°.

*Example 2*

20 g. of 2-carboxymethyl-3-ethyl-9,10-dimethoxy-1,4,6,7-tetrahydro-11bH-benzo[a]quinolizine (manufactured according to Helv. Chim. Acta, 42 (1959), p. 772) is dissolved in 200 ml. of 10 percent acetic acid, and the solution then treated with 98 g. of mercury-II acetate and heated to 40° for 16 hours. Thereafter, the mercury-I acetate which separates out in filtered off and the filtrate is treated with hydrogen sulphide. The mercury sulphide which separates out is filtered off, and the filtrate evaporated in vacuum at 40° (water-bath temperature). The residue obtained is dissolved in ca. 100 ml. of methanol, treated with 7.5 ml. of 48 percent hydrobromic acid, and the solution again evaporated. The residue obtained is thereafter dissolved in 40 ml. of methanol. After addition of acetone and ether, 2-carboxymethyl-3-ethyl - 6,7 - dihydro - 9,10-dimethoxy-benzo[a] quinolizinium bromide crystallizes out. There is thus obtained 8.4 g. of this substance having a melting point (decomposition) of 245°.

*Example 3*

10 g. of 2-carbomethoxymethyl-3-ethyl-9,10-dimethoxy-1,4,6,7-tetrahydro-11bH-benzo[a]quinolizine in 500 ml. of 10 percent aqueous acetic acid, together with 39.6 g. of mercury-II acetate, is heated to 40° for 20 hours. Thereafter, the mercury-I acetate which separates out is filtered off, the filtrate heated to about 40° and hydrogen sulphide introduced during about 10 minutes. After cooling, the resulting mercury sulphide is filtered off and the filtrate concentrated in vacuum at 40° to about 120 ml. It is then made alkaline with caustic soda, and extracted with 200 ml. of chloroform. The chloroform is thereafter evaporated in vacuum, whereupon there are obtained 3.1 g. of residue and, after recrystallization from methanol, 1.72 g. of 2-carbomethoxymethylidene-3-ethyl-9,10-dimethoxy-6,7-dihydro - 2H - benzo[a]quinolizine of melting point 213–214°. By reaction with ethanolic hydrochloric acid and addition of ether there is obtained therefrom 2-carbomethoxymethyl-3-ethyl-9,10-dimethoxy-6,7-dihydro-benzo[a] - quinolizinium chloride of melting point 204° (under decomposition).

*Example 4*

9.10 g. of the 2-methyl-3-ethyl-6,7-dihydro-9,10-dimethoxy-benzo[a]quinolizinium bromide (obtained according to Example 1) and 9.05 g. of 2-benzyl-3,4-dihydro-6,7-dimethoxy-isoquinolinium bromide are dissolved together in 100 ml. of water. The solution is then cooled to 0° in an ice-bath and there is added thereto 150 ml. of 40 percent aqueous trimethyl amine solution. The solution is then left to warm up to room temperature. After 15–30 minutes the 2-[(2'-benzyl-6',7'-dimethoxy-1',2',3',4'-tetrahydro-1'-isoquinolinyl) - methyl]-3-ethyl-9,10-dimethoxy-6,7-dihydro-benzo[a]quinolizinium bromide crystallizes out after prior seeding. It is further stirred for about 2–3 hours at room temperature and then filtered off. After washing with aqueous trimethyl amine solution and with water and after drying in vacuum, there is obtained 11.4 g. of pale-yellow crystals which begin to decompose at about 150°. U.V. maxima in rectified alcohol 230 (shoulder), 287, 372 m$\mu$, $\epsilon \cdot 10^{-3}$=21.8, 17.1, 13.6.

In place of aqueous trimethyl amine solution there can be used a 2 N aqueous sodium hydroxide solution which is slowly added into the solution of the starting compound in total amount of 25 ml. By so doing, the reaction product usually separates out oily and crystallizes very slowly.

*Example 5*

3.32 g. of the 2-[(2'-benzyl-6'7'-dimethoxy-1',2',3',4'-tetrahydro-1'-isoquinolinyl)-methyl]-3-ethyl - 9,10 - dimethoxy-6,7-dihydro-benzo[a]quinolizinium bromide (obtained according to Example 4) in 20 ml. of glacial acetic acid is hydrogenated at 60° under normal hydrogen pressure with the provision of 1 g. of 5 percent palladium-carbon. After uptake of the theoretical amount of hydrogen, the catalyst is filtered off. The filtrate is thereafter treated with 0.7 ml. of 63 percent aqueous hydrobromic acid and concentrated in vacuum at about 40°. The 2-[(6',7'-dimethoxy - 1',2',3',4' - tetrahydro - 1'-isoquinolinyl)-methyl]-3-ethyl - 9,10 - dimethoxy - 6,7 - dihydro - benzo[a]quinolizinium bromide hydrobromide spontaneously crystallizes out from a solution of the residue in a small amount of ethanol. It is cooled down to 0° and filtered, whereupon 1.85 g. of this substance is obtained with a decomposition point of about 180–185°. U.V. maxima in rectified alcohol; max. 230 (shoulder), 268 (shoulder), 285 and 365 m$\mu$, $\epsilon \cdot 10^{-3}$=23.5, 11.9, 18.2, 15.8.

The compound thus obtained can be reduced to dehydro-emetine and dehydro-isoemetine by means of sodium borohydride.

*Example 6*

3 g. of 2-[(2'-benzyl-6',7'-dimethoxy-1',2',3',4'-tetrahydro-1'-isoquinolinyl) - methyl]-3-ethyl-9,10-dimethoxy-6,7-dihydro-benzo[a]quinolizinium bromide (obtained according to Example 4) is dissolved in a solution of 0.375 g. of hydrogen bromide in 37.5 ml. of methanol. To this solution is slowly added dropwise under ice-cooling, a solution of 3 g. of sodium borohydride in 10 ml. of water in the course of 20 minutes. After about 30 minutes it is evaporated in vacuum and the residue obtained partitioned between water and benzene. Thereafter the benzene extract is evaporated and the residue dissolved in 30 ml. of glacial acetic acid and hydrogenated in the presence of 1.5 g. of 5 percent palladium/carbon at 60° under normal hydrogen pressure. After the cessation of the hydrogen uptake, the catalyst is filtered off and the filtrate evaporated in a vacuum. The residue obtained is thereafter partitioned between chloroform and dilute sodium hydroxide solution. The chloroform extract is evaporated in a vacuum, and the residue obtained dissolved in 12 ml. of methanol and treated with 1.35 g. of anhydrous oxalic acid. 1.70 g. of the acid oxalate of 2-dehydro-emetine crystallizes out. The crystals are filtered off, the filtrate concentrated in a vacuum and the residue partitioned between chloroform and dilute sodium hydroxide solution. The chloroform extract is again concentrated in vacuum and the residue dissolved in methanol and made acid with methanolic hydrochloric acid. After the addition of ether up to turbidity, 0.80 g. of 2-dehydro-emetine dihydrochloride crystallizes out.

*Example 7*

1.092 g. of 2-methyl-3-ethyl-6,7-dihydro-9,10-dimethoxy-benzo[a]quinolizinium bromide (obtained according to Example 1) and 0.936 g. of 2-allyl-3,4-dihydro-6,7-dimethoxy-isoquinolinium bromide are dissolved together in 10 ml. of water. To this solution, there is added 15 ml. of 40 percent aqueous trimethyl amine solution and the solution is left to stand for 3 days at room temperature whereupon 2-[(2'-allyl-6',7'-dimethoxy - 1',2',3',4'-tetrahydro - 1' - isoquinolinyl) - methyl]-3-ethyl-9,10-dimethoxy - 6,7 - dihydro - benzo[a]quinolizinium bromide crystallizes out. It is filtered off and washed with aqueous trimethyl amine solution and with water. There is thus obtained 0.45 g. of pale-yellow crystals, which begin to decompose at about 170°.

By solution of this salt in a small excess of alcoholic hydrobromic acid and addition of acetone and ether, there is obtained 2-[(2'-allyl-6',7'-dimethoxy-1',2',3',4'-tetrahydro - 1' - isoquinolinyl) - methyl] - 3 - ethyl-9,10-dimethoxy - 6,7-dihydro-benzo[a]quinolizinium bromide hydrobromide as pale-yellow crystals: decomposition at 220°.

The above obtained 2-[(2'-allyl-6',7'-dimethoxy-1',2', 3',4' - tetrahydro - 1' - isoquinolinyl) - methyl] - 3-ethyl-9,10-dimethoxy-6,7-dihydro - benzo[a]quinolizinium bromide hydrobromide can be reduced by means of an alkali metal borohydride (such as sodium borohydride) to 2-[(2' - allyl - 6',7' - dimethoxy - 1',2',3',4' - tetrahydro-1'-isoquinolyl) - methyl] - 3 - ethyl - 9,10-dimethoxy-6,7-dihydro-benzo[a]quinolizinium bromide. This latter compound can be reduced by catalytic hydrogenation, for example employing platinum, palladium or nickel as the catalyst, to 2-[(2'-propyl-6',7'-dimethoxy-1',2',3',4'-tetrahydro-1'-isoquinolyl)-methyl]-3-ethyl - 9,10 - dimethoxy-1,4,6,7-tetrahydro-benzo[a]quinolizine.

2-allyl-3,4-dihydro-6,7-dimethoxy - isoquinolinium bromide used as starting material hereinbefore is obtained by reacting 19.1 g. of 3,4-dihydro-6,7-dimethoxy-isoquinoline with 12.1 g. of allyl bromide in 120 ml. of benzene at room temperature. The precipitate is filtered and recrystallized from alcohol-ether. There are thus obtained 14.1 g. of 2-allyl-3,4-dihydro-6,7-dimethoxy-isoquinolinium bromide of decomposition point 170°.

*Example 8*

3 g. of 2-methyl-3-ethyl-6,7-dihydro-9,10-dimethoxy-benzo[a]quinolizinium bromide is stirred in 30 ml. of water and 45 ml. of benzene together with 1.73 g. of homoveratryl isocyanate (manufactured from homoveratryl amine hydrochloride and phosgene in boiling chlorobenzene). To the emulsion which results, there is added dropwise 30 ml. of 30 percent sodium hydroxide solution at 5–10° while stirring. The mixture is then further stirred at 20° for 6 hours. Thereafter the organic phase is separated, dried over sodium sulphate and evaporated. The residue obtained is treated with methanolic hydrochloric acid and again evaporated to dryness and dissolved in alcohol/acetic ester, whereupon there crystallizes the homoveratryl amide of 2-carboxymethyl-3-ethyl-9,10-dimethoxy-6,7 - dihydro - benzo[a]quinolizinium chloride which has a decomposition point of about 241°. This compound shows the following maxima in the U.V. spectrum: 233 (shoulder), 268 (shoulder), 283, 368 m$\mu$, $\epsilon \cdot 10^{-3}$=20.2, 13.7, 18.1, 14.0 (in rectified alcohol).

2 g. of the homoveratryl amide obtained above is dissolved in 40 ml. of water. After the addition of 10 ml. of 30 percent caustic soda, it is extracted with 50 ml. of ethyl acetate. The ethyl acetate is then evaporated in vacuum, and the well-dried residue is dissolved in 50 ml. of benzene and, together with 0.8 ml. of phosphorous oxychloride, boiled at reflux for 90 minutes. The reaction mixture is then evaporated to dryness in vacuum, whereupon 2 - [(6',7'-dimethoxy-1',2',3',4'-tetrahydro-1'-isoquinolyl) - methylidene] - 3-ethyl-9,10-dimethoxy-6,7-dihydro-benzo[a]quinolizinium chloride hydrochloride is obtained, having a decomposition point of about 185°. This compound shows the following maxima in the U.V. spectrum: 230 (shoulder), 268 (shoulder), 282, 350, 474 m$\mu$, $\epsilon \cdot 10^{-3}$=21.7, 15.6, 17.5, 10.3, 36.3 (in rectified alcohol). The corresponding perchlorate has a melting point of 254°.

*Example 9*

The 2 - [(6',7' - dimethoxy - 1',2',3',4' - tetrahydro-1'-isoquinolyl) - methylidene] - 3 - ethyl - 9-10-dimethoxy- 6,7-dihydro-benzo[a]quinolizinium chloride obtained in Example 8 above is dissolved in 10 ml. of methanol and 10 ml. of water. To this solution, there is added in the course of about ½ hour, 1.1 g. of sodium borohydride in small portions and the mixture is left to stand for a further 1 hour at room temperature. Thereupon the methanol is removed in vacuum, and the aqueous suspension extracted with chloroform. The residue from the chloroform solution is dissolved in 8 ml. of methanol and treated with a solution of 0.79 g. of anhydrous oxalic acid in 1.75 ml. of methanol. This yields 0.90 g. of the acid oxalate of 2-dehydro-isoemetine of melting point 174–175°, which crystallizes out.

The mother liquors are evaporated to dryness and the residue partitioned between aqueous caustic soda and benzene. After evaporation of the benzene, the residue is dissolved in methanol and converted into the hydrochloride with methanolic hydrochloric acid. By addition of ether, there is obtained 0.4 g. of crystalline 2-dehydro-emetine dihydrochloride of melting point 246°.

*Example 10*

The crude 2-[(6′,7′-dimethoxy-1′,2′,3′,4′-tetrahydro-1′-isoquinolyl) - methylidene] - 3 - ethyl - 9,10 - dimethoxy-6,7-dihydrobenzo[a]quinolizinium chloride obtained according to Example 8 is dissolved in methanol and again evaporated to dryness. The residue is dissolved in 50 ml. of methanol, treated with 0.8 ml. of 60 percent perchloric acid and heated to reflux temperature for a short time. After cooling, the perchlorate of the methylidene compound crystallizes out. By so doing there are obtained 1.35 g. of melting point 254°. A still further 0.235 g. of melting point 228° can be obtained from the mother liquors.

0.1 g. of the perchlorate thus obtained is suspended in 3 ml. of water at 0.5 ml. of methanol. In the course of 10 minutes, 0.3 g. of sodium borohydride in 1.2 ml. of water is added dropwise into said suspension while stirring at 20°. After a further 10 minutes, 4 ml. of chloroform are added and after ½ hour, the organic phase is separated. The residue from the chloroform solution consists of a mixture of 2-dehydro-emetine and 2-dehydro-isoemetine which can be separated as has been described above.

*Example 11*

The homoveratryl amide of 2-carboxymethyl-3- ethyl-9,10 - dimethoxy - 6,7 - dihydro - benzo[a]quinolizinium chloride obtained according to Example 8 is cyclised with phosphorous oxychloride. The product obtained thereby is dissolved in 10 ml. of methanol and 1 ml. of 1 N hydrochloric acid, and then hydrogenated with 0.05 g. of platinum oxide at normal pressure. After uptake of the theoretical amount of hydrogen the catalyst is filtered off and the filtrate concentrated to dryness. The residue is recrystallized from methanol-ether. By so doing there is obtained the chloride hydrochloride of 1,2,3,4,5,11b-trisdehydro-emetine having a melting point of 176–178°.

The compound thus obtained can be converted into a mixture of 2-dehydro-emetine and 2-dehydro-isoemetine by reduction with sodium borohydride.

*Example 12*

Via treatment of 2-[(6′,7′-dimethoxy-1′,2′,3′,4′-tetrahydro - 1′ - isoquinolyl) - methylidene] - 3 - ethyl - 9,10-dimethoxy-6,7-dihydro-benzo[a]quinolizinium perchlorate obtained according to Example 8 with sodium hydroxide, there is obtained the free base, 2-[(6′,7′-dimethoxy-1′,2′, 3′,4′ - tetrahydro - 1′ - isoquinolyl) - methylidene] - 3-ethyl - 9,10 - dimethoxy - 6,7 - dihydro - benzo[a]quinolizine, which shows the following maxima in the U.V. spectrum: 256 (shoulder), 304, 465 m$\mu$, $\epsilon \cdot 10^{-3}$=20.4, 19.5, 23.9 (in rectified alcohol).

I claim:
1. A method for the preparation of compounds having a cation of the formula

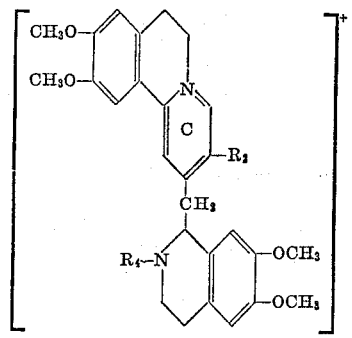

wherein
$R_4$ is selected from the group consisting of benzyl, lower alkyl and allyl;
$R_2$ is lower alkyl;
which comprises reacting a compound having a cation of the formula

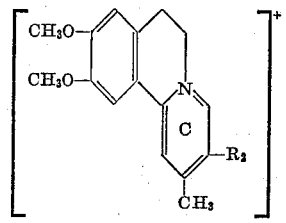

wherein $R_2$ has the same meaning as above; with a compound having a cation of the formula

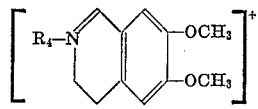

wherein $R_4$ has the same meaning as above.

2. A process as in claim 1 wherein the reaction is conducted in an aqueous basic medium.

3. A method for the preparation of compounds having a cation of the formula

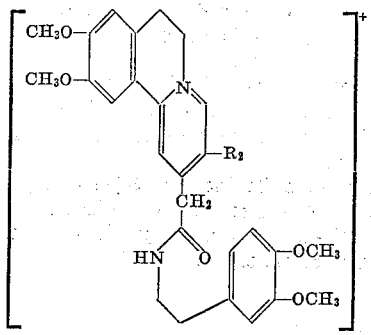

wherein $R_2$ is lower alkyl; which comprises reacting a compound having a cation of the formula

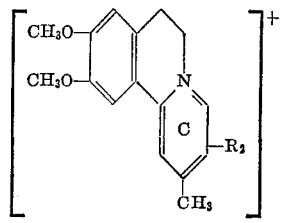

wherein $R_2$ has the same meaning as above; with a compound of the formula

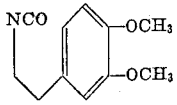

4. A compound having a cation of the formula

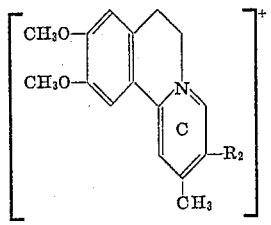

wherein $R_2$ is lower alkyl.

5. A compound having the 2-methyl-3-ethyl-6,7-dihydro-9,10-dimethoxy-benzo[a]quinolizinium cation.

6. A compound having a cation of the formula

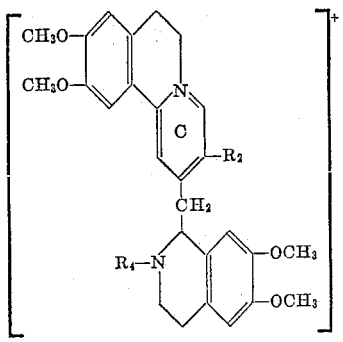

wherein $R_4$ is selected from the group consisting of benzyl, lower alkyl and allyl; $R_2$ is lower alkyl.

7. A compound having the 2-[(α'-benzyl-6',7'-dimethoxy - 1',2',3',4' - tetrahydro - 1' - isoquinolyl) - methyl] - 3 - ethyl - 9,10 - dimethoxy - 6,7 - dihydro - benzo[a]quinolizinium cation.

8. A compound having the 2-[(2'-allyl-6',7'-dimethoxy-1',2',3',4' - tetrahydro - 1' - isoquinolyl) - methyl] - 3-ethyl - 9,10 - dimethoxy - 6,7 - dihydro - benzo[a]quinolizinium cation.

9. A compound having the 2-[(2'-propyl-6',7'-dimethoxy - 1',2',3',4' - tetrahydro - 1' - isoquinolyl) - methyl] - 3 - ethyl - 9,10 - dimethoxy - 6,7 - dihydro - benzo[a]quinolizinium cation.

10. A compound selected from the group consisting of compounds having a cation of the formula

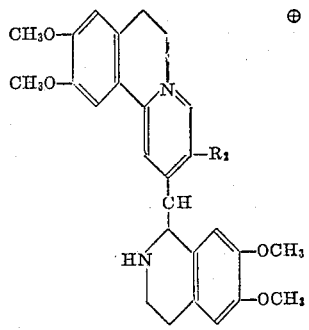

wherein $R_2$ is lower alkyl, acid addition salts thereof and tertiary bases corresponding thereto.

11. A compound having the 2-[(6',7'-dimethoxy-1',2',3',4' - tetrahydro - 1' - isoquinolyl) - methylidene] - 3-ethyl - 9,10 - dimethoxy - 6,7 - dihydro - benzo[a]quinolizinium cation.

12. A compound selected from the group consisting of compounds having a cation of the formula

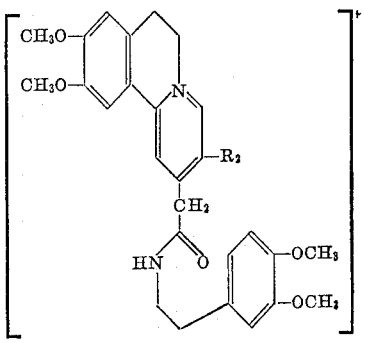

wherein $R_2$ is lower alkyl, acid addition salts thereof and tertiary bases corresponding thereto.

13. A compound having the homoveratrylamide of 2 - carboxymethyl - 3 - ethyl - 9,10 - dimethoxy - 6,7-dihydro-benzo[a]quinolizinium cation.

References Cited

UNITED STATES PATENTS 3,105,835  10/1963  Walker et al. _____ 260—288
3,159,638  12/1964  Ritchie et al. _____ 260—287
3,240,782  3/1966  Brossi et al. _____ 260—286

FOREIGN PATENTS 977,789  12/1964  Great Britain.

OTHER REFERENCES

Brossi et al.: Helv. Chim. Acta, vol. 42, pp. 772–7 (1959).

ALEX MAZEL, *Primary Examiner.*

D. G. DAUS, *Assistant Examiner.*

UNITED STATES PATENT OFFICE
CERTIFICATE OF CORRECTION

Patent No. 3,359,264                            December 19, 1967

Max Gerecke

It is hereby certified that error appears in the above numbered patent requiring correction and that the said Letters Patent should read as corrected below.

In the heading to the printed specification, line 10, after "7,040/63" insert -- 7,041/63 --. Column 3, line 1, "R," should read -- $R_4$, --. Column 11, line 49, "2-[(α'-" should read -- 2-[(2'- --. Column 12, lines 3 to 15, the formula should appear as shown below:

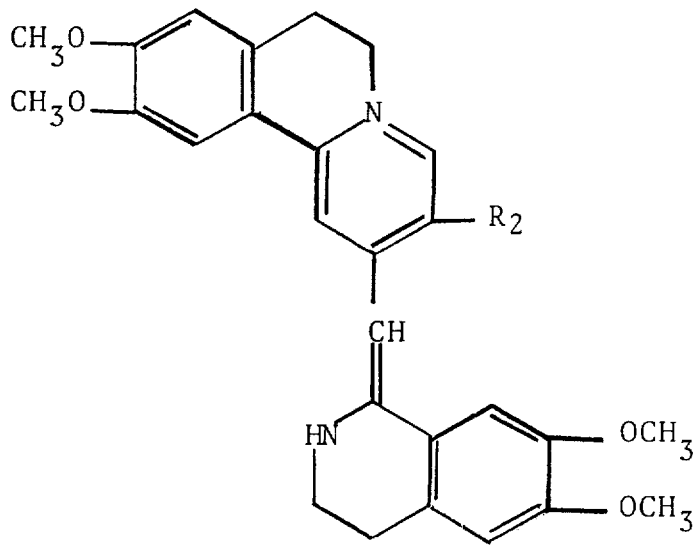

Signed and sealed this 9th day of September 1969.

(SEAL)
Attest:

EDWARD M. FLETCHER, JR.                 WILLIAM E. SCHUYLER, JR.
Attesting Officer                       Commissioner of Patents